(12) United States Patent
Lim et al.

(10) Patent No.: US 12,488,806 B2
(45) Date of Patent: Dec. 2, 2025

(54) SYSTEM AND METHOD FOR REAL-TIME DETECTION OF USER'S ATTENTION SOUND BASED ON NEURAL SIGNALS, AND AUDIO OUTPUT DEVICE USING THE SAME

(71) Applicants: KOREA INSTITUTE OF SCIENCE AND TECHNOLOGY, Seoul (KR); IUCF-HYU (Industry-University Cooperation Foundation Hanyang University), Seoul (KR)

(72) Inventors: Yoonseob Lim, Seoul (KR); Seung-Cheol Baek, Seoul (KR); Jae Ho Chung, Seoul (KR); Jiyeon Ha, Seoul (KR)

(73) Assignees: Korea Institute of Science and Technology, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 439 days.

(21) Appl. No.: 17/964,405

(22) Filed: Oct. 12, 2022

(65) Prior Publication Data
US 2023/0129442 A1  Apr. 27, 2023

(30) Foreign Application Priority Data
Oct. 26, 2021 (KR) .................. 10-2021-0143672

(51) Int. Cl.
*G10L 25/00* (2013.01)
*G10L 25/51* (2013.01)
*G10L 25/78* (2013.01)

(52) U.S. Cl.
CPC .............. *G10L 25/78* (2013.01); *G10L 25/51* (2013.01); *G10L 2025/783* (2013.01)

(58) Field of Classification Search
CPC ... G10L 25/78; G10L 25/51; G10L 2025/783; G10L 25/30; G10L 15/20; G10L 21/0272; G06F 3/015; G06F 3/165
See application file for complete search history.

(56) References Cited

U.S. PATENT DOCUMENTS

| 11,043,210 B2 * | 6/2021 | Lunner ................... G06F 17/18 |
| 2019/0066713 A1 * | 2/2019 | Mesgarani .............. G10L 25/30 |

(Continued)

FOREIGN PATENT DOCUMENTS

| KR | 10-2000282 B1 | 7/2019 |
| KR | 10-2211048 B1 | 2/2021 |
| KR | 10-2021-0056183 A | 5/2021 |

OTHER PUBLICATIONS

Alickovic, Emina et al., "A Tutorial on Auditory Attention Identification Methods," Frontiers in Neuroscience, vol. 13, Mar. 19, 2019, (pp. 1-17).

(Continued)

*Primary Examiner* — Daniel Abebe
(74) *Attorney, Agent, or Firm* — NSIP Law

(57) ABSTRACT

A system for detecting a sound to which a user is attending based on neural signals includes an audio signal collection unit to collect audio signals including two or more sounds from a surrounding environment around the user; a neural signal collection unit to collect the neural signals of the user; an attended sound detection unit to analyze correlations between the two or more sounds included in the audio signals and the neural signals of the user in real time and determine the sound to which the user is attending based on the correlations; a database unit to store a result of the detection; and an output unit to select and output the stored individual audio signal or output the result of detecting the attended sound in real time according to the presence or (Continued)

absence of the audio signal in the surrounding environment around the user.

11 Claims, 3 Drawing Sheets

(56) References Cited

U.S. PATENT DOCUMENTS

2020/0329322 A1* 10/2020 Ramsay ................ H04R 29/00
2021/0092508 A1*  3/2021 Lawrenson .......... H04R 1/1083
2021/0298647 A1   9/2021 Axo et al.

OTHER PUBLICATIONS

Ding, Nai, and Hongjian He. "Rhythm of silence." *Trends in Cognitive Sciences* 20.2 (2016): pp. 82-84.
O'Sullivan, James A., et al. "Attentional selection in a cocktail party environment can be decoded from single-trial EEG." *Cerebral cortex* 25.7 (Jul. 2015): pp. 1697-1706.

* cited by examiner

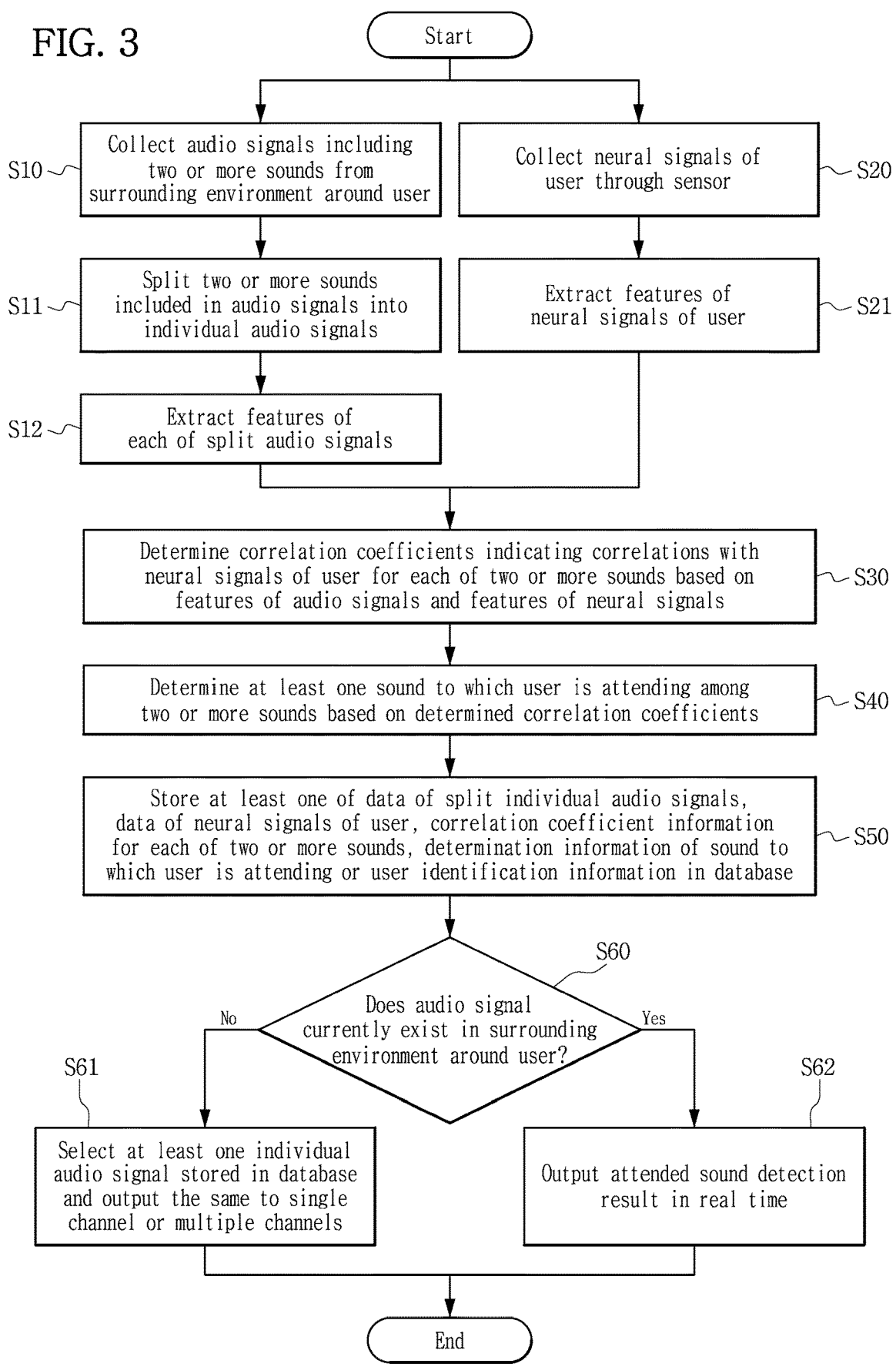

SYSTEM AND METHOD FOR REAL-TIME DETECTION OF USER'S ATTENTION SOUND BASED ON NEURAL SIGNALS, AND AUDIO OUTPUT DEVICE USING THE SAME

CROSS-REFERENCE TO RELATED APPLICATION

This application claims priority to Korean Patent Application No. 10-2021-0143672, filed on Oct. 26, 2021, and all the benefits accruing therefrom under 35 U.S.C. § 119, the contents of which in its entirety are herein incorporated by reference.

BACKGROUND

1. Field

The present disclosure relates to a system and method for detecting a sound to which a user (a listener) is attending in a noisy environment in which there are multiple sounds and an output device using the same, and more particularly, to technology that determines a sound to which a user is attending in real time by splitting multiple sounds collected from the surrounding environment into individual audio signals and analyzing correlations between each audio signal and neural signals of the user.

DESCRIPTION OF GOVERNMENT-FUNDED RESEARCH AND DEVELOPMENT

This research is conducted by Korea Institute of Science and Technology under the support of National Research Council of Science & Technology research expense support project (Development of AI-based assessment technology of degenerative decline in brain function in old people through speech big data in daily conversation, Project Serial Number: 1711149279, Project Code Number: CAP21051-100) of Ministry of Science and ICT.

This research is conducted by Hanyang University under the support of individual fundamental research project (Development of auditory brain-computer interface and its application, Project Serial Number: 1711136718, Project Code Number: 2021R1F1A1054810) of Ministry of Science and ICT.

2. Description of the Related Art

Humans have the ability to attentively listen to specific desired sounds in noisy environments in which there are multiple sounds. It is known that selective auditory attention works by modulating the neural representation of sounds, and sounds (for example, speech sounds by speakers in conversations, sounds including necessary information) on which listeners focus their attention consciously or unconsciously are stronger at the neural level, and unattended sounds (for example, sounds in conversations between strangers, radio sounds from the streets) are weaker at the neural level.

Based on these findings, Auditory Attention Detection (AAD) for detecting attended sounds (i.e., sounds to which listeners are attending) in noisy environments in which there are multiple sounds is being studied in various areas of research. The AAD may be incorporated into audio filters to selectively amplify or reduce audio signals, and its potential application is found in various types of products, for example, adaptive hearing aids or speakers.

The typical AAD collects electroencephalography (EEG) signals and detects attended sounds by analyzing correlations between the EEG signals and individual audio signals. For example, earlier studies discriminate attended sounds from unattended sounds by comparing the amplitude or latency of event-related potential (ERP) signals elicited by specific auditory stimuli (P300).

However, the earlier studies cannot detect the attended sounds in real time since they compare the pre-recorded EEG signals with the audio signals one by one, and to obtain ERP responses to the individual audio signals, it is necessary to calculate an average of neural responses to the same sound repetitively given to the listeners, resulting in inefficiency. Additionally, these methods fail to obtain proper detection results for sound stimuli having the acoustic properties dynamically changing with time such as natural language speech.

SUMMARY

The present disclosure is directed to providing a system and method for determining a sound to which a user is attending in real time by analyzing correlations between individual audio signals and neural signals of the user based on the features extracted from the audio signals and the neural signals. The present disclosure is further directed to providing an audio output device capable of automatically adjusting the volume according to the user's attention level using the auditory attention detection system.

A system for detecting a sound to which a user is attending based on neural signals according to an embodiment includes an audio signal collection unit configured to collect audio signals including two or more sounds from a surrounding environment around the user; a neural signal collection unit configured to collect the neural signals of the user; and an attended sound detection unit configured to analyze correlations between the two or more sounds included in the audio signals and the neural signals of the user in real time, and determine the sound to which the user is attending based on the correlations.

According to an embodiment, the attended sound detection unit may include an audio signal splitter module configured to split the two or more sounds included in the audio signals into individual audio signals; an audio signal feature extraction module configured to extract features of each of the split audio signals; a neural signal feature extraction module configured to extract features of the neural signals of the user; a correlation analysis module configured to determine correlation coefficients indicating the correlations with the neural signals of the user for each of the two or more sounds based on the features of the audio signals and the features of the neural signals; and an attended sound determination module configured to determine at least one sound to which the user is attending among the two or more sounds based on the determined correlation coefficients.

According to an embodiment, the attended sound determination module may be configured to determine the sound having a highest correlation coefficient or the sound having the correlation coefficient that is equal to or larger than a threshold among the two or more sounds as the sound to which the user is attending.

According to an embodiment, the system may further include a database unit including an audio signal storage module configured to store data of the split individual audio signals; a neural signal storage module configured to store data of the neural signals of the user; and a detection result storage module configured to store the correlation coefficients for each of the two or more sounds and determination information of the sound to which the user is attending.

According to an embodiment, the database unit may further include a user information management module configured to store user identification information.

According to an embodiment, the system may further include an audio signal output unit configured to select at least one individual audio signal pre-stored in the audio signal storage module and output the same to a single channel or multiple channels, in case that there is currently no audio signal in the surrounding environment around the user; and a detection result output unit configured to output a result of the detection by the attended sound detection unit in real time, in case that the audio signal currently exists in the surrounding environment around the user.

According to an embodiment, the detection result output unit may be configured to output the determination information of the sound to which the user is attending, pre-stored in the detection result storage module, in case that there is currently no audio signal in the surrounding environment around the user.

According to an embodiment, the correlation analysis module may be trained to analyze the correlations between the audio signals and the neural signals using a machine learning model.

According to an embodiment, the neural signals may be electroencephalography (EEG) signals, and the neural signal collection unit may include an EEG sensor that is attached to a head of the user.

An audio output device capable of automatically adjusting an output volume according to an attention level of a user according to an embodiment includes an audio signal collection unit configured to collect audio signals including two or more sounds from a surrounding environment around the user; a neural signal collection unit configured to collect neural signals of the user; an attended sound detection unit configured to analyze correlations between the two or more sounds included in the audio signals and the neural signals of the user, and determine the attention level of the user for each sound based on the correlations; a control unit configured to increase the output volume of the sound to which the user is attending at the attention level that is equal to or larger than a threshold, and reduce the output volume of the sound to which the user is attending at the attention level that is less than the threshold; and an audio output unit configured to output the sound whose volume is adjusted by the control of the control unit.

A method for detecting a sound to which a user is attending based on neural signals according to an embodiment includes collecting audio signals including two or more sounds from a surrounding environment around the user; splitting the two or more sounds included in the audio signals into individual audio signals; extracting features of each of the split audio signals; collecting the neural signals of the user through a sensor; extracting features of the neural signals of the user; determining correlation coefficients indicating correlations with the neural signals of the user for each of the two or more sounds based on the features of the audio signals and the features of the neural signals; and determining at least one sound to which the user is attending among the two or more sounds based on the determined correlation coefficients.

According to an embodiment, the method may further include storing at least one of data of the split individual audio signals, data of the neural signals of the user, correlation coefficient information for each of the two or more sounds, determination information of the sound to which the user is attending or user identification information in a database.

According to an embodiment, the method may further include selecting the at least one individual audio signal stored in the database and outputting the same to a single or multiple channels, in case that there is currently no audio signal in the surrounding environment around the user; or outputting a result of detecting the attended sound in real time, in case that the audio signal currently exists in the surrounding environment around the user.

There is provided a computer program stored in a computer-readable recording medium, for performing the method for detecting a sound to which a user is attending based on neural signals according to the above-described embodiments.

According to an embodiment of the present disclosure, there may be the system for determining a sound to which a user is attending in real time by splitting multiple sounds collected from the surrounding environment around the user into individual audio signals and analyzing correlations between each audio signal and neural signals of the user. Most of the existing auditory attention detection techniques are designed to detect auditory attention based on pre-collected neural signals in lab environments, while the proposed system does not need any session for decoder training and testing, and can detect the sound to which the user is attending every second.

According to an embodiment, the split individual audio signals, the neural signals data of the user, the determination information of the sound to which the user is attending and the user identification information may be stored in the database, and the pre-stored individual audio signals may be outputted or the attended sound detection results may be outputted in real time according to the presence or absence of the audio signal in the surrounding environment. According to an embodiment, there may be provided the audio output device configured to determine the level of the user's attention to the individual audio signals based on the correlations with the neural signals and automatically adjust the output volume according to the attention level of the user. The device according to an embodiment can adjust and output the volume of the input audio signals in real time, and thus may be used in a wide range of applications, for example, adaptive hearing aids or speakers. In particular, it is possible to achieve real-time auditory attention detection in daily life environments, not in lab environments, by use of mobile devices including neural signal detection modules, for example, electroencephalography (EEG) sensors.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure.

FIG. 3 is a flowchart showing each step of a method for detecting a sound to which a user is attending according to an embodiment of the present disclosure.

DETAILED DESCRIPTION

Figure 1:
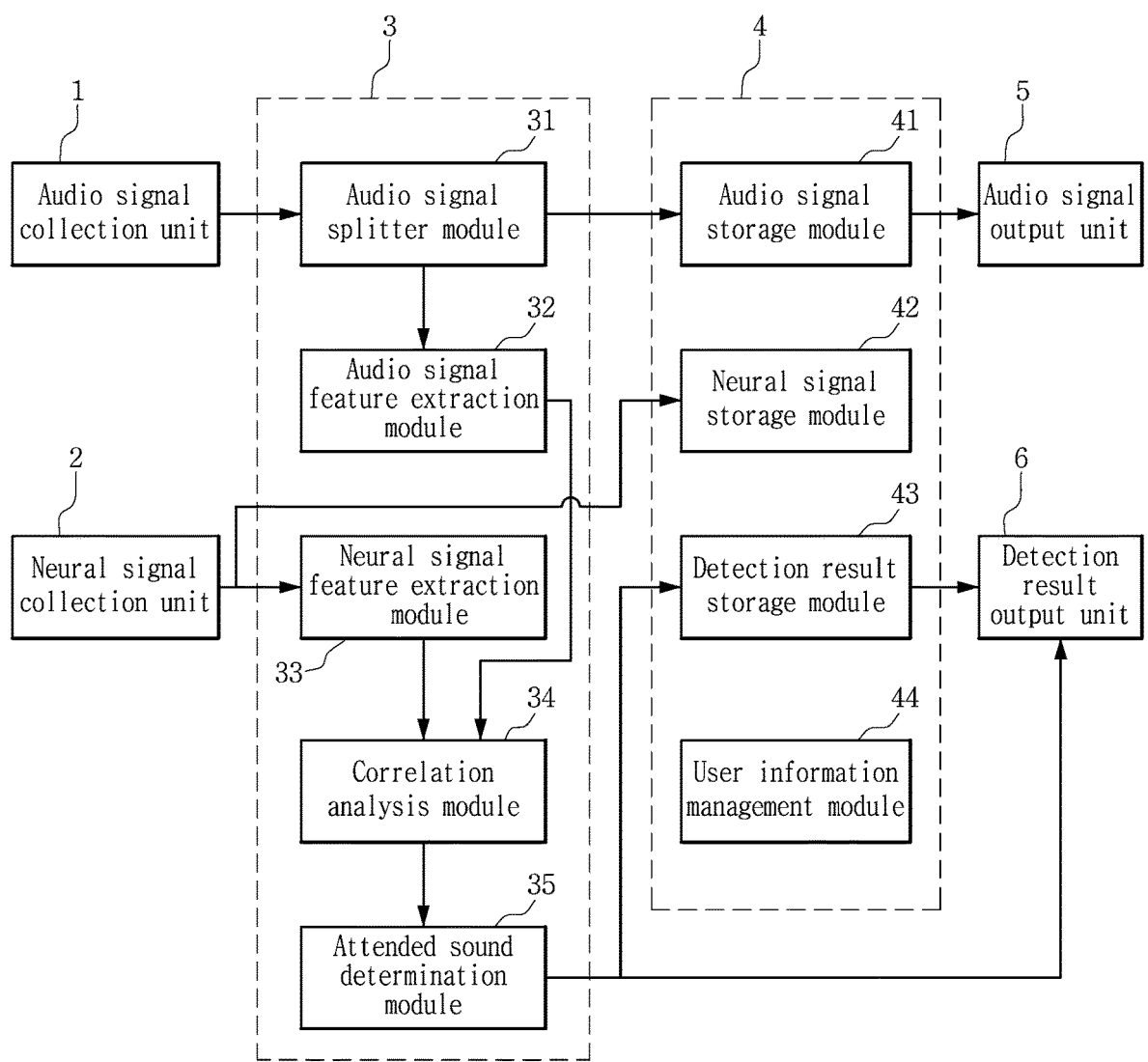
FIG. 1 is a block diagram showing the architecture of a system for detecting a sound to which a user is attending according to an embodiment of the present disclosure.

The following detailed description of the present disclosure is made with reference to the accompanying drawings, in which particular embodiments for practicing the present disclosure are shown for illustrative purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs indicate same or similar functions in many aspects.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Additionally, the embodiment described herein may have aspects of entirely hardware, partly hardware and partly software, or entirely software. The term "unit", "module", "device", "server" or "system" used herein refers to a computer related entity such as hardware, software or a combination thereof. For example, the unit, module, device, server or system may refer to hardware that makes up a platform in part or in whole and/or software such as an application for operating the hardware.

Hereinafter, exemplary embodiments of the present disclosure will be described with reference to the accompanying drawings.

Auditory Attention Detection System Based on Neural Signals

FIG. 1 is a block diagram showing the architecture of a system for detecting a sound to which a user is attending according to an embodiment of the present disclosure.

Referring to FIG. 1, the system for detecting a sound to which a user is attending according to an embodiment may include an audio signal collection unit 1 to collect audio signals from the surrounding environment around the user; a neural signal collection unit 2 to collect neural signals of the user; an attended sound detection unit 3 to determine the sound to which the user is attending based on correlations between the audio signals and the neural signals of the user; a database unit 4 to store information related to auditory attention detection; an audio signal output unit 5 to select at least one individual audio signal pre-stored in the audio signal storage module and output the same to a single channel or multiple channels; and a detection result output unit 6 to output a result of the detection by the attended sound detection unit in real time.

The audio signal collection unit 1 collects the audio signals including two or more sounds in a noisy situation in which there are sounds from multiple sound sources in the surrounding environment around the user. The audio signal collection unit 1 may include a device such as, for example, a microphone and an interface to convert the audio signals detected in the surrounding environment into electrical signals and record the same. According to an embodiment, the audio signal collection unit 1 may include a buffer to store the collected audio signals for a predetermined time for the purpose of real-time operation.

The neural signal collection unit 2 acquires and records the neural signals of the user through a neural signal collector at the same time as the input of the audio signals. According to an embodiment, for the neural signals, EEG signals measured through an electroencephalography (EEG) sensor attached to the user's head may be used. Although the following description is made based on the embodiments using EEG signals, the technical spirit of the present disclosure is not limited thereto and biosignals measured at various body parts may be used for the neural signals. In the same way as the audio signals, the neural signal collection unit 2 may include a buffer to store the collected neural signals for a predetermined time for the purpose of real-time operation.

The attended sound detection unit 3 determines the sound to which the user is attending based on the correlations between the audio signals collected by the audio signal collection unit 1 and the neural signals of the user collected by the neural signal collection unit 2. Referring to FIG. 1, the attended sound detection unit 3 according to an embodiment may include an audio signal splitter module 31 to split the two or more sounds included in the audio signals into individual audio signals; an audio signal feature extraction module 32 to extract the features of each of the split audio signals; a neural signal feature extraction module 33 to extract the features of the neural signals of the user; a correlation analysis module 34 to determine correlation coefficients with the neural signals for each of the individual audio signals based on the features of the audio signals and the features of the neural signals; and an attended sound determination module 35 to determine at least one sound to which the user is attending among the two or more sounds based on the determined correlation coefficients.

When it is analyzed that the audio signals acquired by the audio signal collection unit 1 include two or more sound sources, the audio signal splitter module 31 may split them to extract the individual audio signals. To this end, various types of existing audio signal splitting algorithms may be applied and the present disclosure is not limited to a particular splitting algorithm or extraction method.

The audio signal feature extraction module 32 may extract the signal features for each of the split individual audio signals, and the neural signal feature extraction module 33 may extract the features from the neural signals of the user. Here, the features of the signals are the parameter that indicates the signal features such as the pattern, amplitude and frequency of the audio signals or the neural signals, and when there are changes in the features of the signals being collected, the changes may be detected in real time and used to analyze the correlation.

According to an embodiment, the neural signal feature extraction module 33 may be configured to extract the features of the neural signals according to the features of each user. Since the optimal frequency range of neural signals for auditory attention detection differs in each person, the accuracy of auditory attention detection may be enhanced by setting the optimal frequency range for each user.

The correlation analysis module 34 determines the correlation coefficients between the audio signals and the neural signals. The correlation coefficients indicate the correlations between the individual audio signals and the neural signals of the user, and may be calculated based on the features of the audio signals and the features of the neural signals. According to an embodiment, the correlation analysis module 34 may be trained to analyze the correlations between the audio signals and the neural signals using a machine learning model.

The attended sound determination module 35 determines at least one sound to which the user is attending among the two or more sounds based on the correlation coefficients determined by the correlation analysis module 34. According to an embodiment, the attended sound determination module 35 may determine the sound having the highest correlation coefficient with the neural signals or the sounds having the correlation coefficients that are equal to or larger than the threshold in the two or more individual audio signals as the sound to which the user is attending.

As described above, the attended sound may be determined based on the correlations between the features of the audio signals and the features of the neural signals, and in this instance, when a moving average of the correlation measured at the present time and the correlation measured at the previous time is calculated and the current correlation data is updated, the performance may be improved. The moving average may include a simple moving average, a weighted moving average and an exponential moving average.

The database unit 4 is configured to store the information related to auditory attention detection. Referring to FIG. 1, the database unit 4 according to an embodiment may include an audio signal storage module 41 to store data of the split individual audio signals; a neural signal storage module 42 to store data of the neural signals of the user; a detection result storage module 43 to store the correlation coefficients for each of the two or more sounds and determination information (i.e., information about the sound determined as the attended sound) of the sound to which the user is attending; and a user information management module 44 to store user identification information (the listener's personal information including age, gender, etc.).

In case that there is currently no audio signal in the surrounding environment around the user, the audio signal output unit 5 may select the at least one individual audio signal pre-stored in the audio signal storage module 41 and output the same to the single channel or the multiple channels. The at least one selected audio signal may be simultaneously outputted through the single channel or may be outputted through different channels.

In contrast, in case that the audio signal currently exists in the surrounding environment around the user, the detection result output unit 6 may output a result of the detection by the attended sound detection unit in real time. The detection result output unit 6 may output, for example, the number of sounds to which the user is currently listening, the audio signals to which the user is attending (i.e., the audio signal having the highest correlation coefficient with the neural signals or the audio signals having the correlation coefficients that are equal to or larger than the threshold) and the level of the user's attention to the individual audio signals, and the output data may be updated in real time according to the input to the input unit. The level of the user's attention to the individual audio signals may be determined by each correlation coefficient or through an additional parameter that indicates the degree to which the listener focuses his/her attention on the audio signals. The output data may be provided to the user visually and/or numerically through a display.

Real-time auditory attention detection model Hereinafter, an embodiment of a decoder model for tracking the attention direction of the user in real time and outputting the detection results will be described. The proposed model is based on a linear decoder model widely used for auditory attention detection from stored EEG signal recordings, and is designed to detect changes in the attention direction of the user within a few seconds using real-time streaming neural signals.

The linear decoder model $D(\tau,n)$ applied to an embodiment may be formalized as a function that maps an EEG signal of a channel $n, R(t,n)$ to a sound stimulus $S(t)$ at time t as shown below.

$$\hat{S}(t) = \Sigma_n \Sigma_\tau D(\tau,n) R(t-\tau,n) \qquad \text{[Equation 1]}$$

$\dot{S}(t)$ denotes the estimated speech envelope at time t, and $\tau$ is the time lag reflecting the latency of the EEG signal in response to the speech.

The decoder model may be estimated from the above equation as follows.

$$D = (RR^T + \lambda I)^{-1} RS^T \qquad \text{[Equation 2]}$$

Here, $\lambda$ is the regularization parameter to prevent overfitting.

To develop the model according to an embodiment, a sliding window that allows an overlap to the existing decoder model is applied. The proposed real-time auditory attention detection model is built by averaging all decoder weights estimated from each EEG data snippet. In the similar way to the existing decoder model, the decoder $D_i(\tau, n)$ is configured to map a snippet of EEG signal of the channel $R_j(t_j-\tau,n)$, to its corresponding snippet of speech $S_j(t_j)$ at time $t_j$ and may be formalized as shown below.

$$\hat{S}_j(t_j) = \Sigma_n \Sigma_\tau D_j(\tau,n) R_j(t_j-\tau,n) \qquad \text{[Equation 3]}$$

$\hat{S}_j(t_j)$ is the estimated speech envelope at time $t_j$ and $\tau$, is the time lag parameter. Given a length of speech corresponding to a single trial T, the snippet of speech $s_j(t_j)$ at time $t_j$ may be extracted by the overlapping sliding window. The subscript j denotes the snippet from the $j^{th}$ window, and subset of t=1, . . . , l, may span from (j−1)M+1 to (j=1)M+W. W denotes the window size, and M represents the hop size of the sliding window when the window moves. J is the number of snippets belonging to each trial, and may be represented as $$J = \frac{T - W + 1}{M}$$

based on W and M. In case that the window size W is equal to the trial length and M is 0, then Equation 1 and Equation 3 are the same. The snippet-wise decoder model $D_j$ may be estimated as shown below.

$$D_j = (R_j R_j^T + \lambda I)^{-1} R_j S_j^T \qquad \text{[Equation 4]}$$

Finally, the decoder model may be obtained as shown below by averaging all $D_j$ over every trial.

$$D = \frac{\sum_i \sum_j D_j^i}{I \cdot J} \quad \text{[Equation 5]}$$

When auditory attention detection simulation is performed using the decoder model according to the above embodiment, it can be seen that the detection accuracy is improved with the increasing size of the parameters W and l. In contrast, the size of M does not significantly affect the accuracy.

It is possible to improve the performance of the decoder model by the selection and control of the parameters, and the resulting system can detect changes in the attention direction of the user within a few seconds using streaming neural signals, so it is possible to detect sounds to which the user is attending in real time.

Additionally, the implementation models, equations and numeral values described herein are provided for illustrative purposes and the technical spirit of the present disclosure is not limited thereto.

Figure 2:
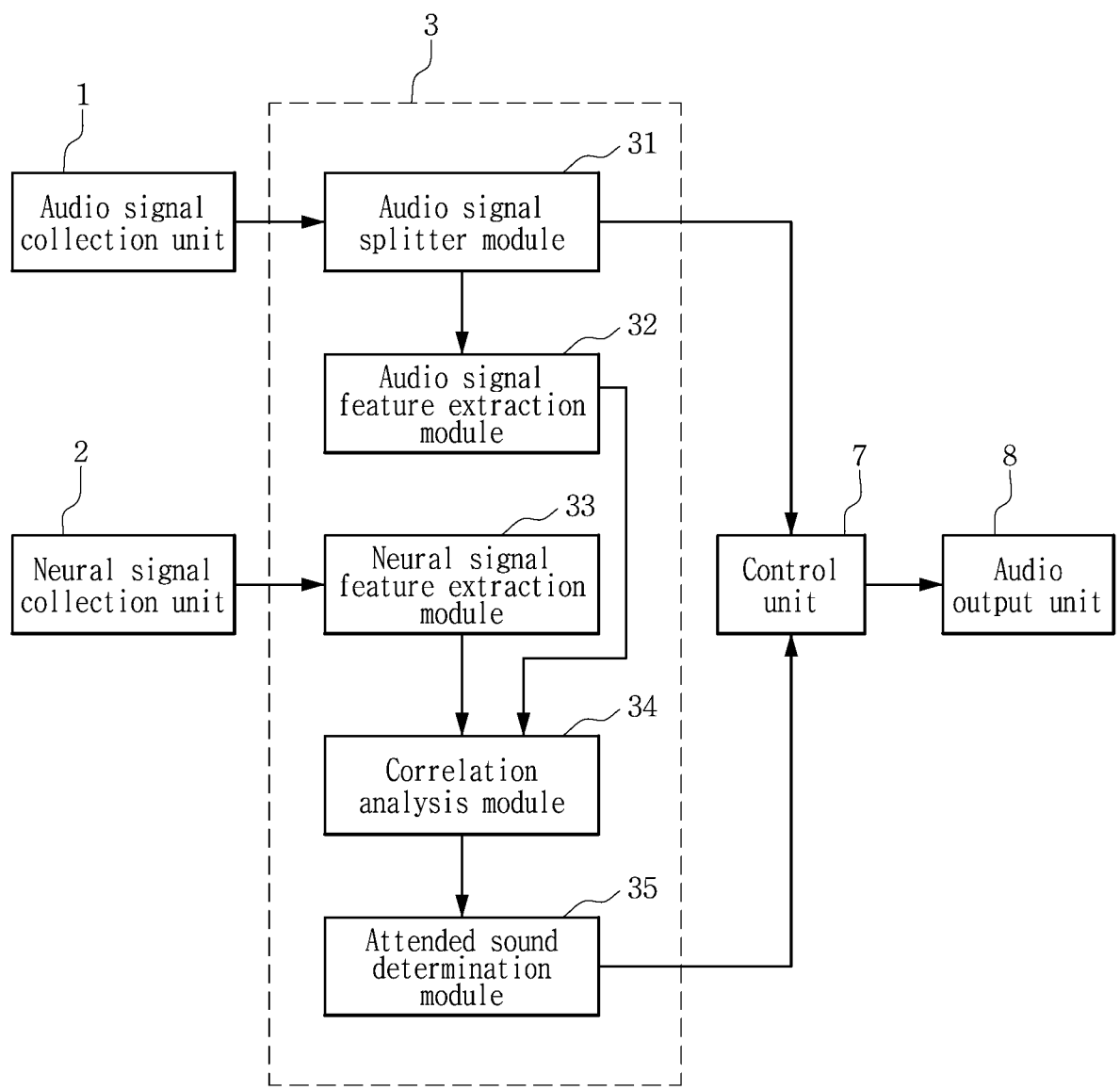
FIG. 2 is a block diagram showing the configuration of an audio output device according to an embodiment of the present disclosure.

Audio Output Device Using System for Detecting a Sound to which a User is Attending FIG. 2 shows the configuration of an audio output device according to an embodiment of the present disclosure. Referring to FIG. 2, the audio output device according to an embodiment includes an audio signal collection unit 1 to collect audio signals including two or more sounds from the surrounding environment around the user; a neural signal collection unit 2 to collect neural signals of the user; an attended sound detection unit 3 to analyze correlations between the two or more sounds included in the audio signals and the neural signals of the user and determine an attention level of the user for each sound based on the correlations; a control unit 7 to increase or reduce the output volume according to the attention level of the user; and an audio output unit 8 to output the sound whose volume is adjusted by the control of the control unit 7.

Here, the audio signal collection unit 1 and the neural signal collection unit 2 is the same as those of the auditory attention detection system described with reference to FIG. 1, and to avoid redundancy, its description is omitted. The attended sound detection unit 3 is mostly the same as the embodiment of FIG. 1, but may not only select at least one attended sound but also determine the attention level of the user for each individual sound based on the correlations.

The control unit 7 is configured to increase the output volume of the sound to which the user is attending at the attention level that is equal to or larger than the threshold and reduce the output volume of the sound to which the user is attending at the attention level that is less than the threshold in the individual audio signals present in the audio signals. The audio output unit 8 includes an output device, for example, a speaker, and is configured to output the sound whose volume is adjusted by the control of the control unit 7.

The audio output device according to the above embodiment may filter the individual audio signals in real time according to the attention level of the user in a noisy situation in which there are multiple sounds, and thereby selectively increase the volume of the desired sound to which the user wants to listen. The audio output device may be used to develop hearing aids or adaptive speakers.

Method for detecting a sound to which a user is attending based on neural signals FIG. 3 is a flowchart showing each step of a method for detecting a sound to which a user is attending according to an embodiment of the present disclosure.

Referring to FIG. 3, first, the step (S10) of collecting audio signals including two or more sounds from the surrounding environment around the user is performed. Subsequently, the step (S11) of splitting the two or more sounds included in the audio signals into individual audio signals and the step (S12) of extracting the features from each of the split audio signals are performed.

Apart from the steps S10 to S12, the step (S20) of collecting neural signals of the user through the sensor and the step (S21) of extracting the features of the neural signals of the user are performed. The steps S10 to S12 and the steps S20 to S21 may be performed regardless of the order, and they may be simultaneously performed through a parallel processor or may be sequentially performed in a single processor.

Subsequently, the step (S30) of determining correlation coefficients with the neural signals for each of the two or more sounds based on the features of the audio signals and the features of the neural signals is performed. As described above, the correlation coefficients indicate correlations between the individual audio signals and the neural signals, and may be determined through a machine learning based analysis model. For example, in case that the neural signals show a specific pattern when the listener is attentively listening to a sound, the correlation coefficient may be calculated by quantifying the size of the pattern or pattern changes. Since the audio signal having a high correlation coefficient represents a high attention level of the user, the audio signal may be determined as the attended sound in the next step.

Subsequently, the step (S40) of determining at least one sound to which the user is attending among the two or more sounds based on the determined correlation coefficients is performed. For example, a sound having the highest correlation coefficient with the neural signals or sounds having the correlation coefficients that are equal to or larger than the threshold in the two or more individual audio signals may be determined as the sound to which the user is attending.

Subsequently, the step (S50) of storing information related to auditory attention detection including data of the split individual audio signals, data of the neural signals of the user, correlation coefficient information for each of the two or more sounds, determination information of the sound to which the user is attending and user identification information in the database is performed.

Finally, the step (S60) of determining that the audio signal currently exists in the surrounding environment around the user is performed. in case that there is currently no audio signal in the surrounding environment around the user, the step (S61) of selecting at least one individual audio signal stored in the database and outputting the same to the single channel or the multiple channels is performed. Here, the at least one selected audio signal may be simultaneously outputted through the single channel or may be outputted through different channels.

In contrast, in case that the audio signal currently exists in the surrounding environment around the user, the step (S62) of outputting the attended sound detection results in real time is performed. The output detection results may include, for example, the number of sounds to which the user is currently listening, the audio signals to which the user is attending (i.e., the audio signal having the highest correlation coefficient with the neural signals or the audio signals having the correlation coefficients that are equal to or larger than the threshold) and the level of the user's attention to the individual audio signals. The level of the user's attention to the individual audio signals may be determined by each correlation coefficient or through an additional parameter that indicates the degree to which the listener focuses his/her attention on the audio signals. The output data may be provided to the user visually and/or numerically through the display.

The method for detecting a sound to which a user is attending based on neural signals according to an embodiment may be implemented as an application or in the format of program instructions that may be executed through a variety of computer components and may be recorded in computer readable recording media. The computer readable recording media may include program instructions, data files and data structures alone or in combination.

Examples of the computer readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

According to the system for detecting a sound to which a user is attending in real time as described hereinabove, the sound to which the user is attending may be determined in real time by splitting multiple sounds collected from the surrounding environment around the user into individual audio signals, and analyzing the correlations with the neural signals of the user for each audio signal. Additionally, the split individual audio signals, the neural signal data of the user, the determination information of the sound to which the user is attending and the user identification information may be stored in the database, and the pre-stored individual audio signals may be outputted or the attended sound detection results may be outputted in real time according to the presence or absence of the audio signal in the surrounding environment. Most of the existing auditory attention detection techniques are designed to detect auditory attention based on pre-collected neural signals in lab environments, while the proposed system does not need any session for decoder training and testing, and can detect the sound to which the user is attending every second.

According to an embodiment, there may be provided the audio output device configured to determine the level of the user's attention to the individual audio signals based on the correlations with the neural signals and automatically adjust the output volume according to the attention level of the user, and the device can adjust and output the volume of the input audio signals in real time, and thus may be used in a wide range of applications, for example, adaptive hearing aids or speakers. In particular, it is possible to achieve real-time auditory attention detection in daily life environments, not in lab environments, by use of mobile devices including neural signal detection modules, for example, EEG sensors.

Although the present disclosure has been hereinabove described with regard to the embodiments, those skilled in the art will understand that a variety of modifications and changes may be made to the present disclosure without departing from the spirit and scope of the present disclosure described in the appended claims.

What is claimed is:

1. A system for detecting a sound to which a user is attending based on neural signals, the system comprising:
   an audio signal collection unit configured to collect audio signals including two or more sounds from a surrounding environment around the user;
   a neural signal collection unit configured to collect the neural signals of the user;
   an attended sound detection unit configured to analyze correlations between the two or more sounds included in the audio signals and the neural signals of the user in real time, and determine the sound to which the user is attending based on the correlations, the attended sound detection unit configured to split the two or more sounds included in the audio signals into individual audio signals;
   a database unit configured to store data of the split individual audio signals collected from the surrounding environment;
   an audio signal output unit configured to select output at least one individual audio signal stored in the database unit to a single channel or multiple channels, wherein the selection and output are performed only when no audio signal is detected from the surrounding environment at a current time point, and wherein the stored individual audio signal is generated from audio signals that were collected in real time from the surrounding environment of the user; and
   a detection result output unit configured to output, in real time, the detection result of the attended sound detection unit based on the correlation analysis, wherein the output is performed only when an audio signal is detected from the surrounding environment at the current time point.

2. The system for detecting a sound to which a user is attending based on neural signals according to claim 1, wherein the attended sound detection unit includes:
   an audio signal splitter module configured to split the two or more sounds included in the audio signals into individual audio signals;
   an audio signal feature extraction module configured to extract features of each of the split audio signals;
   a neural signal feature extraction module configured to extract features of the neural signals of the user;
   a correlation analysis module configured to determine correlation coefficients indicating the correlations with the neural signals of the user for each of the two or more sounds based on the features of the audio signals and the features of the neural signals; and
   an attended sound determination module configured to determine at least one sound to which the user is attending among the two or more sounds based on the determined correlation coefficients.

3. The system for detecting a sound to which a user is attending based on neural signals according to claim 2, wherein the attended sound determination module is configured to determine the sound having a highest correlation coefficient or the sound having the correlation coefficient that is equal to or larger than a threshold among the two or more sounds as the sound to which the user is attending.

4. The system for detecting a sound to which a user is attending based on neural signals according to claim 2, wherein the database unit includes:
   an audio signal storage module configured to store data of the split individual audio signals;
   a neural signal storage module configured to store data of the neural signals of the user; and
   a detection result storage module configured to store the correlation coefficients for each of the two or more sounds and determination information of the sound to which the user is attending.

5. The system for detecting a sound to which a user is attending based on neural signals according to claim 4, wherein the database unit further includes a user information management module configured to store user identification information.

6. The system for detecting a sound to which a user is attending based on neural signals according to claim 1, wherein the detection result output unit is configured to output the determination information of the sound to which the user is attending, pre-stored in the detection result storage module, in case that there is currently no audio signal in the surrounding environment around the user.

7. The system for detecting a sound to which a user is attending based on neural signals according to claim 2, wherein the correlation analysis module is trained to analyze the correlations between the audio signals and the neural signals using a machine learning model.

8. The system for detecting a sound to which a user is attending based on neural signals according to claim 1, wherein the neural signals are electroencephalography (EEG) signals, and the neural signal collection unit includes an EEG sensor that is attached to a head of the user.

9. An audio output device capable of automatically adjusting an output volume according to an attention level of a user, the audio output device comprising:
an audio signal collection unit configured to collect audio signals including two or more sounds from a surrounding environment around the user;
a neural signal collection unit configured to collect neural signals of the user;
an attended sound detection unit configured to analyze correlations between the two or more sounds included in the audio signals and the neural signals of the user, and determine the attention level of the user for each sound based on the correlations, the attended sound detection unit configured to split the two or more sounds included in the audio signals into individual audio signals;
a database unit configured to store data of the split individual audio signals collected from the surround environment;
a control unit configured to increase the output volume of the sound to which the user is attending at the attention level that is equal to or larger than a threshold, and reduce the output volume of the sound to which the user is attending at the attention level that is less than the threshold;
an audio output unit configured to output the sound whose volume is adjusted by the control of the control unit;
an audio signal output unit configured to select and output at least one individual audio signal stored in the database unit to a single channel or multiple channels, wherein the selection and output are performed only when no audio signal is detected from the surrounding environment at a current time point and wherein the stored individual audio signal is generated from audio signals that were collected in real time from the surrounding environment of the user; and
a detection result output unit configured to output, in real time, the detection result of the attended sound detection unit based on the correlation analysis, wherein the output is performed only when an audio signal is detected from the surrounding environment at the current time point.

10. A method for detecting a sound to which a user is attending based on neural signals, the method comprising:
collecting audio signals including two or more sounds from a surrounding environment around the user;
splitting the two or more sounds included in the audio signals into individual audio signals;
extracting features of each of the split audio signals;
collecting the neural signals of the user through a sensor;
extracting features of the neural signals of the user;
determining correlation coefficients indicating correlations with the neural signals of the user for each of the two or more sounds based on the features of the audio signals and the features of the neural signals;
determining at least one sound to which the user is attending among the two or more sounds based on the determined correlation coefficients; and
storing at least one of data of the split individual audio signals collected from the surrounding environment, data of the neural signals of the user, correlation coefficient information for each of the two or more sounds, determination information of the sound to which the user is attending or user identification information in a database,
wherein the method further comprises
selecting and outputting the at least one individual audio signal stored in the database to a single or multiple channels, wherein the selection and output are performed only when no audio signal is detected from the surrounding environment at a current time point, and wherein the stored individual audio signal is generated from audio signals that were collected in real time from the surrounding environment of the user; or
outputting a result of detecting the attended sound in real time, wherein the output is performed only when an audio signal is detected from the surrounding environment at the current time point.

11. A computer program stored in a computer-readable recording medium, for performing the method for detecting a sound to which a user is attending based on neural signals according to claim 10.

* * * * *